United States Patent [19]

Saiki

[11] Patent Number: 5,377,776
[45] Date of Patent: Jan. 3, 1995

[54] FRAME STRUCTURE FOR A MOTORCYCLE

[75] Inventor: Terunari Saiki, Tokyo, Japan

[73] Assignee: Honda Giken Kogyo Kabushiki Kaisha, Tokyo, Japan

[21] Appl. No.: 194,002

[22] Filed: Feb. 9, 1994

[30] Foreign Application Priority Data

Feb. 9, 1993 [JP] Japan .................. 5-021149

[51] Int. Cl.6 ............................. B62K 19/06
[52] U.S. Cl. .................. 180/219; 280/281.1
[58] Field of Search ............. 280/281.1, 274; 180/219, 311

[56] References Cited

U.S. PATENT DOCUMENTS

| | | | |
|---|---|---|---|
| 4,475,617 | 10/1984 | Minami et al. | 180/219 |
| 4,577,719 | 3/1986 | Nomura et al. | 180/219 |
| 4,744,434 | 5/1988 | Miyakoshi et al. | 180/219 |
| 5,012,883 | 5/1991 | Hiramatsu | 280/281.1 X |

FOREIGN PATENT DOCUMENTS

| | | | |
|---|---|---|---|
| 2-2714 | 1/1990 | Japan . | |
| 2246891 | 10/1990 | Japan | 180/219 |
| 5105159 | 4/1993 | Japan | 180/219 |

Primary Examiner—Eric D. Culbreth
Assistant Examiner—F. Zeender

[57] ABSTRACT

An improved motorcycle frame structure is provided to increase the rigidity of a frame of a motorcycle around a pivot plate. A cross pipe is mounted between lower portions of left and right pivot plates, and lower end portions of left and right center pipes are welded to the cross pipe. Another cross pipe is mounted between upper portions of the left and right center pipes. An intermediate portion of the right side center pipe is welded to a position of the inner side of a pivot plate forwardly of the pivot shaft receiver by way of a pipe member while an intermediate portion of the left side center pipe is coupled to a position on the inner side of the other pivot plate forwardly of the pivot shaft receiver by way of a bolt.

5 Claims, 5 Drawing Sheets

FRAME STRUCTURE FOR A MOTORCYCLE

BACKGROUND OF THE INVENTION

1. Field of the Invention

This invention relates generally to a structure of a frame for a motorcycle and more particularly to an improved frame structure with increased rigidity in the area of the pivot plate.

2. DESCRIPTION OF BACKGROUND ART

A known frame structure for a motorcycle is disclosed in Japanese Utility Model Publication Application No. Heisei 2-2714. This frame structure is constructed such that a pair of left and right main pipes and a pair of left and right down pipes extend from a head pipe and cross pipes are provided between rear portions of the left and right main pipes and the left and right down pipes. A pair of vertical pipes are connected between the cross pipes. The main pipes, the down pipes and a rear frame are coupled into a unitary member by way of side stays (pivot plates). A pivot for supporting a front end portion of a rear fork thereon is provided on each of the side stays.

With the frame structure described above, sufficient rigidity can be exhibited against a load acting in a vertical direction, but when force acts in a leftward or rightward direction, a distortion of the frame likely occurs around the side stays (pivot plates). The tendency is high particularly in the case wherein the main pipe is extended to a further rear position in order to avoid interference with another member such as an exhaust pipe. In that case, the mounting positions of the pivot plates also extend to further rear positions and the tendency for distortion is increased.

SUMMARY OF THE INVENTION

In order to solve the problem described above, according to the present invention, a frame structure for a motorcycle wherein a pair of left and right main pipes extend rearwardly and downwardly from a head pipe and pivot plates for supporting front end portions of a rear fork for pivotal motion thereon are mounted at rear end portions of the main pipes. The construction is such that upper end portions of center pipes are coupled to positions of the main pipes higher than the mounting portions of the pivot plates, and lower end portions of the center pipes are coupled to lower portions of the pivot plates, and further, intermediate portions of the center pipes are coupled to the pivot plates at positions forward of the pivotally supporting portions for the rear fork.

Since the center pipes are coupled at the intermediate portions thereof to the pivot plates, the rigidity around the pivot plates is greatly increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
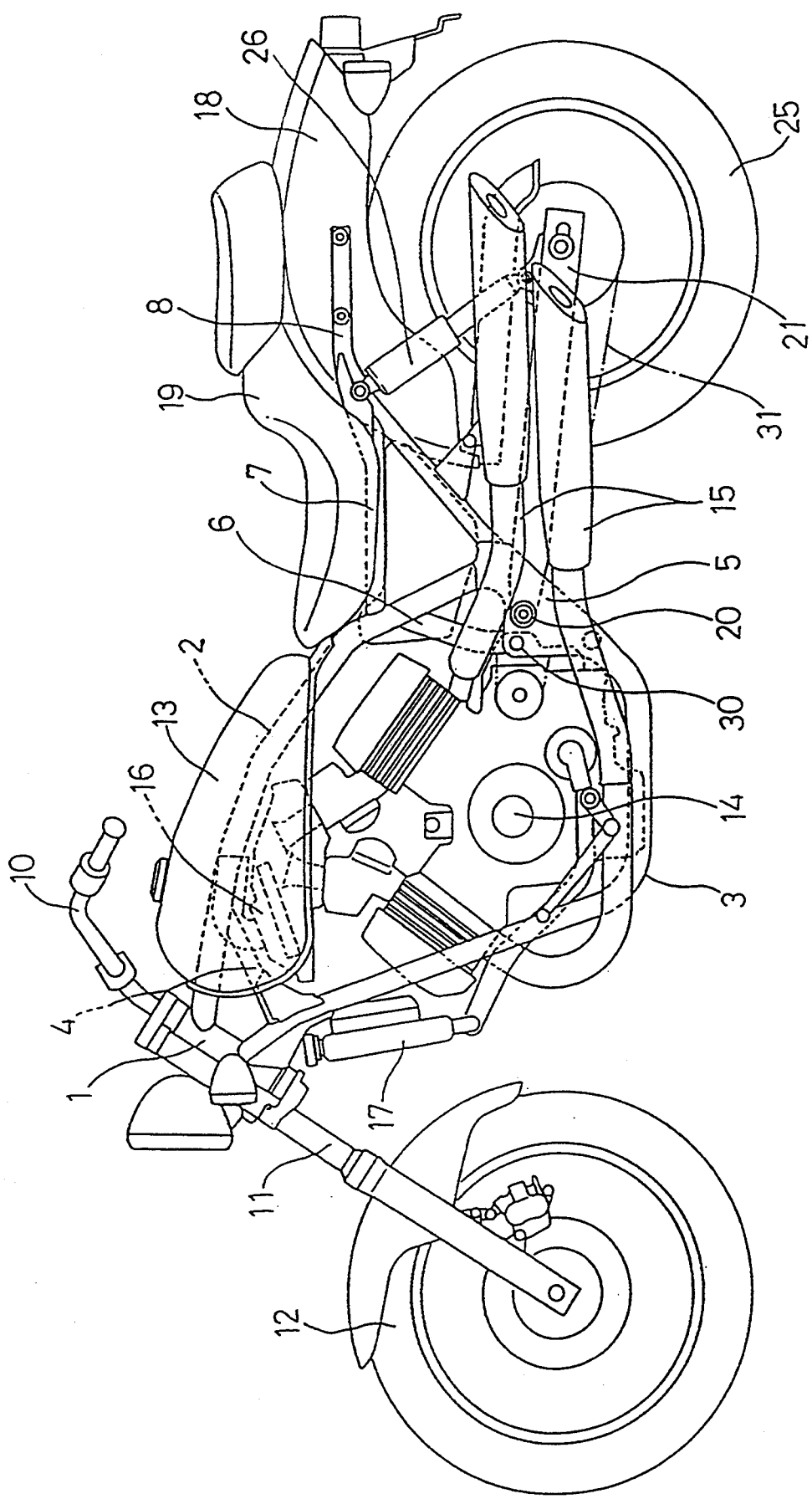
FIG. 1 is a side elevational view of an entire motorcycle to which a frame structure according to the present invention is applied.
Figure 2:
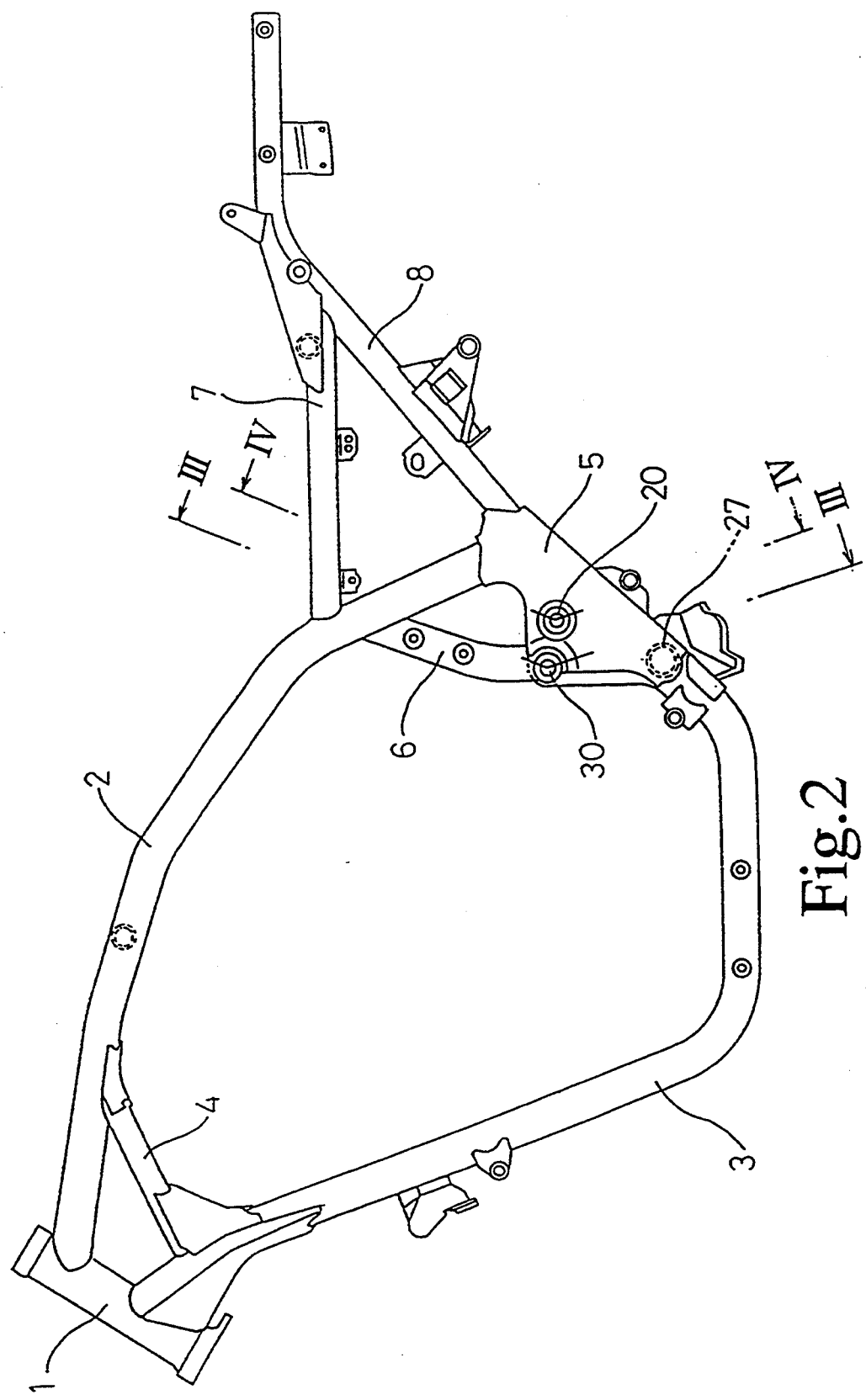
FIG. 2 is a side elevational view of the frame structure.

In FIG. 1 a cradle type motorcycle frame according to the present invention is shown. The principal portions of the motorcycle frame include a head pipe 1, main pipes 2, down pipes 3, front sub pipes 4, pivot plates 50 center pipes 6, seat rails 7 and rear sub pipes 8.

A steering shaft is inserted in the head pipe 1, and a handle bar 10 is mounted on the steering shaft. Further, a front fork 11 is mounted on upper and lower bridges on the steering shaft, and a front wheel 12 is supported at a lower end portion of the front fork 11.

The main pipes 2 include a left and right main pipe. The front end portions of the left and right main pipes 2 are welded to an upper portion of the head pipe 1. The main pipes 2 extend rearward and downward from the head pipe 1. A fuel tank 13 is secured such that it extends across the left and right main pipes 2.

The down pipes 3 include a left and right down pipe. The left and right down pipes 3 extend rearward and downward from a lower portion of the head pipe 1. The down pipes 3 are curved at intermediate portions thereof and extend substantially horizontally rearwardly from the thus curved portions. A V-type four-cylinder engine 14 is carried in a space defined by the main pipes 2 and the down pipes 3. An exhaust pipe 15 leads from the engine 14 and extends rearwardly past the outer side of the pivot plate 5. An air cleaner 16 is provided above the engine 14 and a radiator 17 is provided forwardly of the engine 14.

The seat rails 7 include a left and right seat rail 7. The front end portions of the seat rails 7 are welded to rear portions of the main pipes 2. The rear end portions of the seat rails 7 are welded to the left and right sub pipes 8. A rear fender 18 is mounted at rear portions of the left and right rear sub pipes 8 and a seat 19 is provided on the rear fender 18 and the seat rails 7.

The pivot plates 5 include left and right pivot plates 5. Each pivot plate 5 has a substantially triangular shape in side elevation and is formed from two plate members joined together such that the inside thereof is hollow. The rear lower end portions of the main pipes 2, rear end portions of the down pipes 3 and front end portions of the rear sub pipes 8 are welded to the pivot plates 5.

Figure 4:
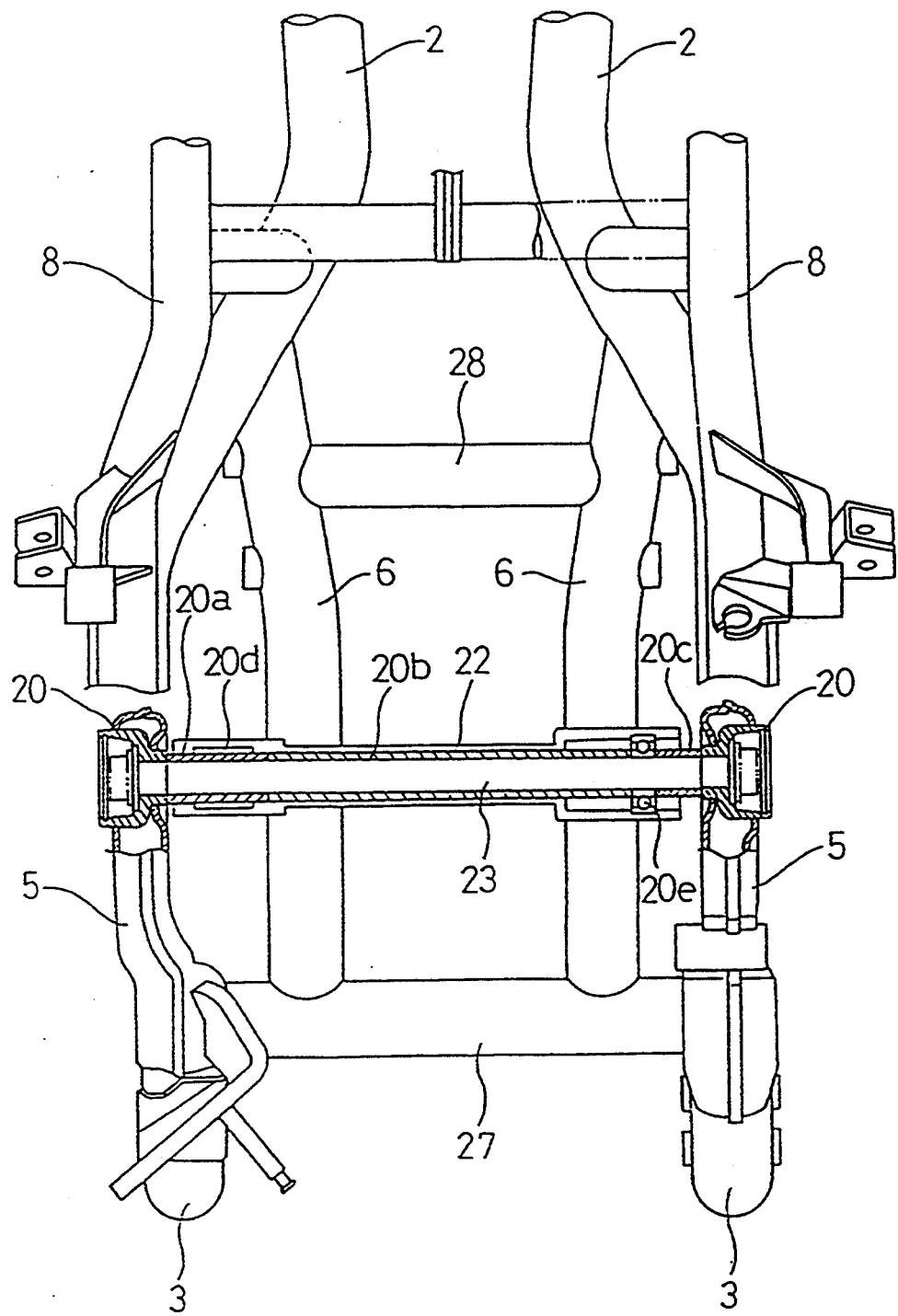
FIG. 4 is an enlarged view as viewed in the direction of line IV—IV in FIG. 2.
Figure 5:
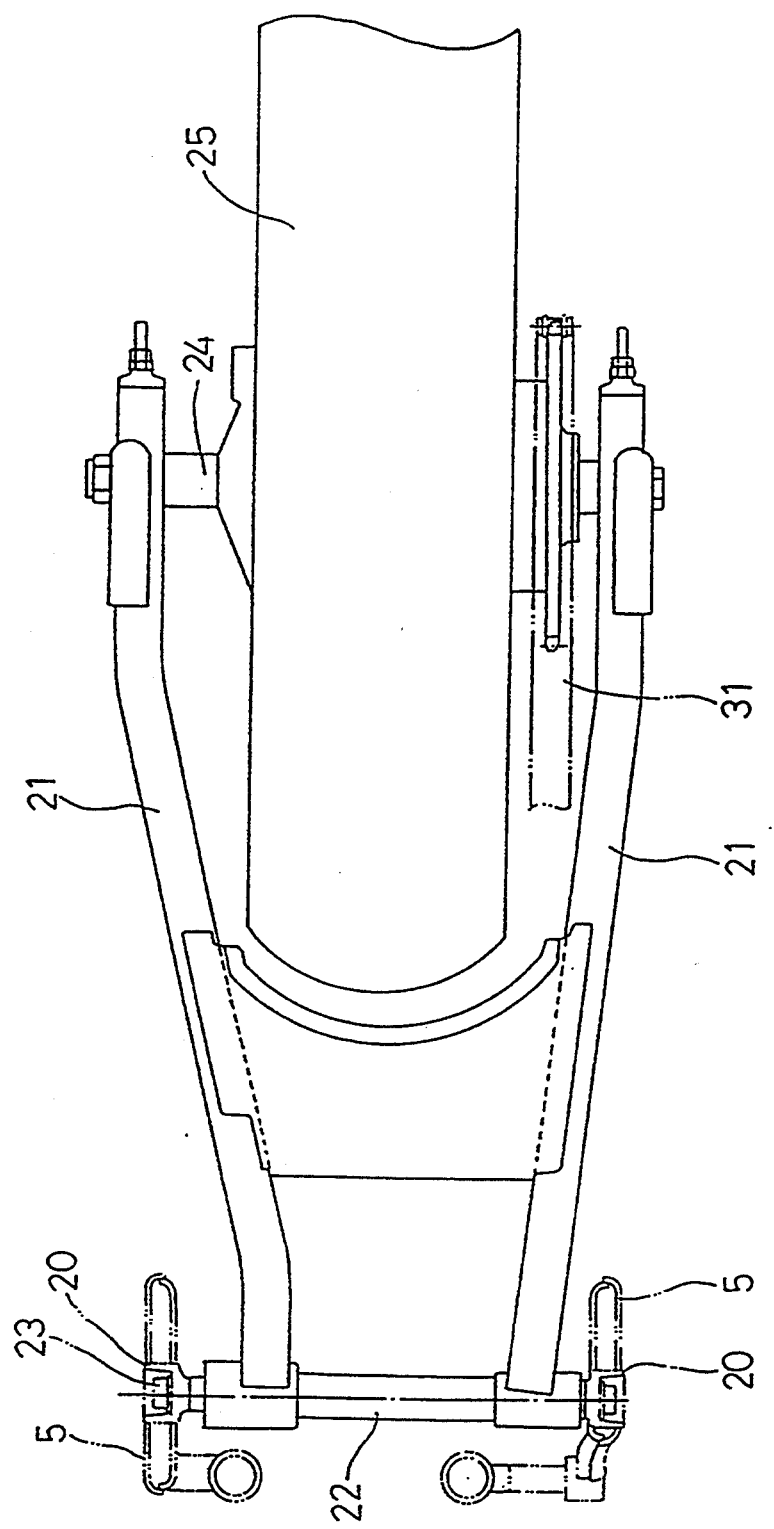
FIG. 5 is a plan view of a rear fork.

Pivot shaft receivers 20 are mounted substantially at the centers of the left and right pivot plates 5 as shown in FIGS. 4 and 5. The collars 20a, 20b and 20c are positioned between the pivot shaft receivers 20 and 20. Further, a collar 22 to which a front end portion of a rear fork 21 is welded is fitted for rotation on the outer sides of the collars 20a, 20b and 20c by way of a ball bearing 20e and a needle bearing 20d. A pivot shaft 23 is inserted in the pivot shaft receivers 20 and the collars 20a, 20b and 20c and is tightened from the opposite sides to support the front end portions of the rear fork 21 for pivotal motion on the pivot plates 5.

Further, as shown in FIG. 5, an axle 24 is mounted between rear end portions of the rear fork 21. A rear wheel 25 is supported for rotation on the axle 24 and dampers 26 are interposed between the rear fork 21 and the rear sub pipes 8, as shown in FIG. 1.

Figure 3:
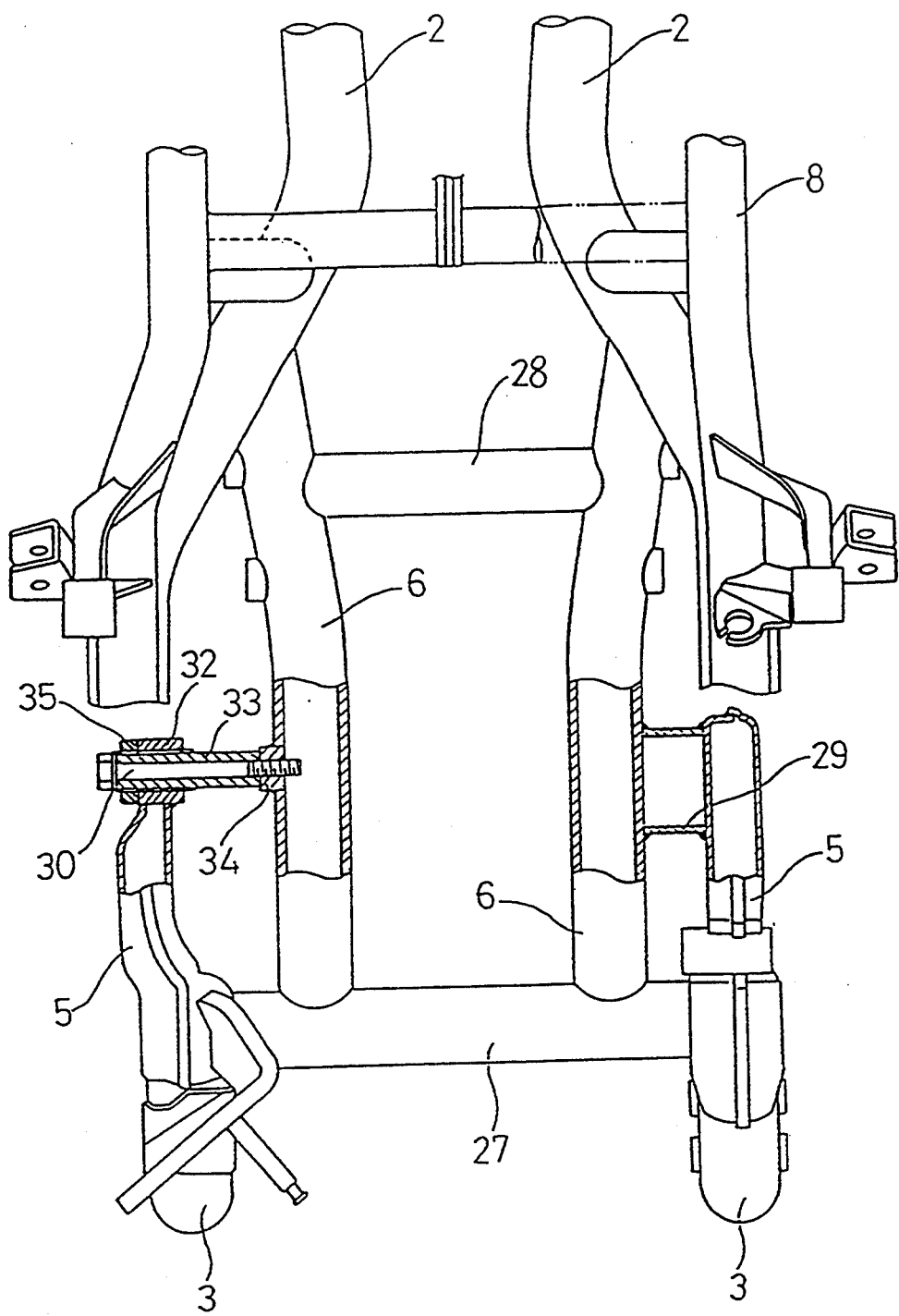
FIG. 3 is an enlarged view as viewed in the direction of line III—III in FIG. 2.

As shown in FIGS. 3 and 4, a cross pipe 27 is mounted between lower portions of the left and right pivot plates 5. The lower end portions of the left and right center pipes 6 are welded to the cross pipe 27. The upper end portions of the center pipes 6 are welded to intermediate portions of the main pipes 2.

Further, another cross pipe 28 is mounted between upper portions of the left and right center pipes 6. As shown in FIG. 3, an intermediate portion of the right side center pipe 6 is welded to a position on the inner side of the pivot plate 5 forwardly of the pivot shaft receiver 20 by way of a pipe member 29. An intermediate portion of the left side center pipe 6 is bolted to a position on the inner side of the pivot plate 5 forwardly of the pivot shaft receiver 20 by way of a bolt 30.

While one of the center pipes 6 is coupled in advance to a pivot plate 5, by later coupling the other center pipe 6 to the other pivot plate 5 by means of the bolt 30, an assembly error is absorbed and handling of a chain 31 is facilitated.

In particular, upon assembling the rear fork 21, the collars 20a, 20b and 20c are positioned between the left and right pivot shaft receivers 20 and 20, and the pivot shaft 23 is inserted into the pivot shaft receivers 20 and the collars 20a, 20b and 20c and then fastened as described above. Accordingly, the pivot plates 5 are subject to distortion by this operation. In this instance, if the left and right center pipes 6 are both secured to the pivot plates 5, then the pivot plates 5 are less subject to distortion, resulting in difficulty in mounting the collars 20a, 20b and 20c or in production of a play of the collars 20a, 20b and 20c after mounted. Further, if the left and right center pipes 6 are securely mounted on the pivot plates 5 by way of the pipe member 29 from the beginning, the chain connected in an endless annular fashion must be disassembled and threaded above and below the pipe member 29 and then connected into the endless annular fashion again, which is cumbersome. This is because an upper portion of the chain 31 runs above the pipe member 29 while a lower portion of the chain 31 runs below the pipe member 29, as shown in FIG. 1. However, if coupling is performed later by means of the bolt 30, then such disadvantage is eliminated.

Therefore, a detailed method of coupling the left side center pipe 6 to the pivot plate 5 later by means of the bolt 30 as described above will be described below with reference to FIG. 3.

First, a collar 33 is inserted from the outside into a nut 32 securely mounted on the pivot plate 5. A male thread is formed on an outer periphery in the proximity of an end of the collar 33, and after the collar 33 inserted into the nut 32, the collar 33 is turned to screw the male thread into the female thread of the nut 32, and then the collar 33 is further turned until the end of the collar 33 is abutted with a circumferential edge projection 34 of a bolt hole formed in the center pipe 6.

Thereafter, a nut 35 is secured to the collar 33 so as to abut the nut 32, and then the bolt 30 is inserted into the collar 33 until the end thereof is screwed into the bolt hole to couple the intermediate portion of the left side center pipe 6 to the pivot plate 5.

It is to be noted that, while, in the example shown, the upper ends of the center pipes are coupled directly to the main pipes and the lower ends of the center pipe are coupled to the lower portions of the pivot plates indirectly by way of the cross pipe, the upper ends of the center pipes may be coupled to the main pipes by way of the cross pipe while the lower ends of the center pipes are coupled directly to the lower portions of the pivot plates.

Further, while, in the embodiment, the frame of the cradle type which is formed from the main pipes and the down pipes is shown, the frame may be of another type wherein the engine is suspended and supported on the main pipes without employing a down pipe.

As described hereinabove, according to the present invention, since intermediate portions of center pipes having upper end portions coupled to main pipes and lower end portions coupled to pivot plates are supported on pivot plates mounted at rear end portions of the main pipes, the strength around the pivot plates is enhanced remarkably.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A frame structure for a motorcycle comprising:
   a head pipe;
   left and right main pipes having forward end, rear end, and intermediated portions, the main pipes extending in a rearward and downward direction from said head pipe;
   left and right pivot plates having upper and lower portions, the pivot plates being mounted at said rear end portions of said left and right main pipes and each having a rear fork pivot position;
   a rear fork pivotally supported on said pivot plates at said rear fork pivot positions; and
   left and right center pipes having upper end and lower end, and intermediate portions wherein said upper end portions of said center pipes are coupled said to intermediate portions of said main pipes at a location between said head pipe and said rear end portions of said main pipes, and said lower end portions of said center pipes are coupled to said lower portions of said pivot plates, and further, said intermediate portions of said center pipes are coupled to said pivot plates at positions forwardly of the rear fork pivot positions.

2. The frame structure as in claim 1, wherein said intermediate portion of said left center pipe is coupled to said left pivot plate by a bolt.

3. The frame structure as in claim 1, wherein said intermediate portion of said right center pipe is coupled to said right pivot plate by a pipe member.

4. The frame structure as in claim 1, wherein said upper end portions of said left and right center pipes are coupled directly to said left and right main pipes.

5. The frame structure as in claim 1, wherein said lower end portions of said left and right center pipes are coupled indirectly to said left and right pivot plates by way of a cross pipe.

* * * * *